US008712679B1

(12) United States Patent
Mostofi et al.

(10) Patent No.: US 8,712,679 B1
(45) Date of Patent: Apr. 29, 2014

(54) SYSTEM AND METHODS FOR OBSTACLE MAPPING AND NAVIGATION

(75) Inventors: Yasamin Mostofi, Albuquerque, NM (US); Pradeep Sen, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 213 days.

(21) Appl. No.: 13/284,259

(22) Filed: Oct. 28, 2011

Related U.S. Application Data

(60) Provisional application No. 61/456,003, filed on Oct. 29, 2010.

(51) Int. Cl.
*G01S 13/34* (2006.01)
*G09B 29/00* (2006.01)
*G05D 1/02* (2006.01)

(52) U.S. Cl.
USPC ........... 701/300; 700/248; 700/258; 340/552; 342/191; 342/463

(58) Field of Classification Search
USPC .................... 701/300; 342/27, 191, 451, 463; 340/552–557; 700/248, 258
See application file for complete search history.

(56) References Cited

U.S. PATENT DOCUMENTS

| 2,649,538 | A | * | 8/1953 | Marlowe et al. | 340/552 |
| 5,365,218 | A | * | 11/1994 | Otto | 340/557 |
| 5,559,496 | A | * | 9/1996 | Dubats | 340/539.26 |
| 6,512,481 | B1 | * | 1/2003 | Velazquez et al. | 342/367 |
| 6,941,191 | B2 | * | 9/2005 | Jaeger | 700/245 |
| 7,009,561 | B2 | * | 3/2006 | Menache et al. | 342/463 |
| 7,034,280 | B2 | * | 4/2006 | Beck et al. | 250/221 |
| 7,065,373 | B2 | * | 6/2006 | Rodgers et al. | 455/502 |
| 7,468,697 | B2 | * | 12/2008 | Matsuoka et al. | 342/464 |
| 7,479,920 | B2 | | 1/2009 | Niv | |
| 7,817,092 | B1 | * | 10/2010 | Olivieri et al. | 342/451 |
| 8,138,918 | B2 | * | 3/2012 | Habib et al. | 340/552 |
| 8,199,055 | B2 | * | 6/2012 | Van De Wijdeven | 342/463 |
| 2004/0090329 | A1 | * | 5/2004 | Hitt | 340/552 |
| 2007/0087695 | A1 | * | 4/2007 | Cohen et al. | 455/63.4 |
| 2008/0189036 | A1 | | 8/2008 | Elgersma | |

(Continued)

FOREIGN PATENT DOCUMENTS

| JP | 05226920 | A | * | 9/1993 | H01Q 3/00 |
| JP | 07271434 | A | * | 10/1995 | G05D 1/02 |
| JP | 09233564 | A | * | 9/1997 | H04Q 9/00 |
| JP | 2005236799 | A | * | 9/2005 | H04B 7/15 |

OTHER PUBLICATIONS

Mostofi, Yasamin et al., "Compressive Cooperative Sensing and Mapping in Mobile Networks," Paper ThCO3.5, 2009 American Control Conference (ACC), St. Louis, MO, Jun. 10-12, 2009, pp. 3397-3404.*

(Continued)

*Primary Examiner* — Behrang Badii
*Assistant Examiner* — David Testardi
(74) *Attorney, Agent, or Firm* — Valauskas Corder LLC (57) ABSTRACT

A system and methods for building a map non-invasively (i.e. mapping of occluded and non-occluded obstacles) based on a small number of wireless channel measurements. Approaches for building an obstacle map are based on coordinated space, random space and frequency sampling, such that the sparse representation of the map in space, wavelet or spatial variations, are exploited in order to build the map with minimal sensing.

15 Claims, 6 Drawing Sheets

(56) References Cited

U.S. PATENT DOCUMENTS

2010/0026490 A1* 2/2010 Butler et al. .................. 340/552
2010/0223007 A1    9/2010 James
2012/0146788 A1* 6/2012 Wilson et al. ............ 340/539.23
2013/0162459 A1* 6/2013 Aharony et al. ................ 342/27

OTHER PUBLICATIONS

Lux, P.W. et al., "Range imaging for autonomous navigation of robotic land vehicles", Signal Processing, vol. 22 Issue 3, Mar. 1991, pp. 299-311.*

JPO machine translation of JP 05-226920 (original JP document published Sep. 3, 1993).*

Mostofi, Decentralized Communication-Aware Motion Planning in Mobile Networks: An Information-Gain Approach, Journal of Intelligent and Robotic Systems, May 23, 2009, p. 233-256, vol. 56, Iss. 1-2, Kluwer Academic Publishers, Hingham, Massachusetts.

Mostofi, et al., Compressed Mapping of Communication Signal Strength, Military Communications Conference Nov. 2008, p. 1-7, San Diego, CA.

Candes, et al., An Introduction to Compressive Sampling, IEEE Signal Processing Magazine, Mar. 2008, p. 21-30, vol. 25, Iss. 2.

* cited by examiner

SYSTEM AND METHODS FOR OBSTACLE MAPPING AND NAVIGATION

This application claims the benefit of U.S. Provisional Patent Application No. 61/456,003 filed Oct. 29, 2010.

STATEMENT CONCERNING FEDERALLY SPONSORED RESEARCH

The invention was made with government support under grant 0846483 awarded by the National Science Foundation. The United States Government has certain rights in the invention.

FIELD OF THE INVENTION

The invention relates generally to mapping environments including obstacles positioned within those environments. More particularly, the invention relates to a system and methods for determining the position of obstacles within an environment without sensing the obstacles directly.

BACKGROUND OF THE INVENTION

Obstacle mapping is crucial to the robust operation of robotic networks. Specifically, obstacle mapping relates to determining the location of an object within an environment. In existing approaches, only the obstacles that are directly visible to the robot can be mapped. In other words, occluded obstacles cannot be mapped. Currently, frameworks for mapping of occluded obstacles are lacking.

Autonomous vehicles are widely used and include a variety of unmanned ground vehicles, underwater vehicles, and aerospace vehicles, such as robots and unmanned aerial vehicles ("UAVs"). Autonomous vehicles make decisions and respond to situations completely without human intervention. There are major limitations to the overall performance, accuracy, and robustness of navigation and control of an autonomous vehicle. In order to perform navigation properly, an autonomous vehicle must be able to sense its location, steer toward a desired destination, and avoid obstacles.

Various modalities have been used to provide navigation of autonomous vehicles. These include use of the Global Positioning System ("GPS"), inertial measurements from sensors, and image measurements from cameras. Smaller UAVs are being developed for reconnaissance and surveillance that can be carried and deployed in the field by an individual or a small group. Such UAVs include micro air vehicles ("MAVs") and organic air vehicles ("OAVs"), which can be remotely controlled. Such air vehicles can be designed for operation in a battlefield by troops, and provide small combat teams and individual soldiers with the capability to detect enemy forces concealed in forests or hills, around buildings in urban areas, or in places where there is no direct line-of-sight. Some of these air vehicles can perch and stare, and essentially become sentinels for maneuvering troops.

In order to avoid obstacles during navigation, autonomous vehicles such as UAVs need obstacle mapping. Typical vehicle sensors currently used (e.g., scanning laser detection and ranging ("LADAR") can not map occluded obstacles. An important issue key to the robust operation of a mobile robotic network is the accurate mapping of the obstacles. Accurate mapping of obstacles is challenging in that the high volume of information presented by the environment makes it prohibitive to sense all areas. Typically, mobile robotic networks only map areas that are directly sensed such as through use of Simultaneous Localization and Mapping ("SLAM"). SLAM approaches mainly focus on reducing the uncertainty in the sensed obstacles by using a Kalman filter. Similarly, approaches based on generating an occupancy map also address sensing uncertainty. Another set of approaches are based on the Next Best View ("NBV") approach. In NBV approaches, the aim is to move to the positions that are "good" for sensing, by guiding the mobile unit to the perceived next safest area or area with the most visibility based on the current map. However, areas that are not sensed directly are not mapped in NBV.

When using conventional detection units to generate a map of an environment, the map plots where the obstacles are and where there are no obstacles in the environment. However, conventional detection units cannot access every location of the environment as obstacles frequently block one or more paths of the detection units. Furthermore, obstacles can be dynamic resulting in obstacles which were previously un-obscured, being partially or completely obscured. Thus, there is a need for a see-through based mapping of obstacles. The present invention satisfies this need.

SUMMARY OF THE INVENTION

The invention maps static or dynamic objects (otherwise referred to herein as "obstacles") in an environment. The invention determines the position of an object—occluded or non-occluded—within an environment without sensing the object directly. More specifically, the invention facilitates "see-through" capabilities such that occluded objects can now be mapped (for instance, before entering a room or a building). The invention uses compressive sampling (otherwise known as compressed sensing, compressive sensing or sparse sensing) to estimate signals.

More specifically, the invention relates to cooperative non-invasive object mapping (i.e. with "see-through" capability) through the generation of a spatial map of the obstacles. Obstacle information is extracted from a wireless transmission, by only making a small number of measurements. This is accomplished by using non-uniform sampling theory and limiting multipath fading.

Nodes map obstacles using very few position measurements and using only wireless transceivers. The term "node" refers to a device that may either be mobile or stationary. In one embodiment, the node is a robot device within a mobile ad hoc network ("MANET"). Each node—otherwise referred to herein as a robot device—that is mobile is free to move independently in any direction, and change its links to other nodes frequently.

The invention is advantageous in a variety of applications both robotic and non-robotic such as, emergency response, search and rescue missions, battlefield operations and other hazardous or non-hazardous applications, where an assessment of an area is needed before entering. For example, the invention may be used in military sensing applications such as identifying improvised explosive devices ("IEDs"). Other applications related to the invention include surveillance, security, smart homes, smart factories, and environmental monitoring. For example, the invention facilitates the mapping of environments such as floor plans and large areas. Furthermore, objects inside the environment may be mapped in terms of location and material properties. The invention saves the mapping time and energy of any robotic operation considerably.

The invention provides "see-through" capability in that an environment may be mapped before entering the environment. The invention may also be used as a complement to current mapping approaches such as Simultaneous Localization And Mapping ("SLAM"). SLAM records information obtained from an observation and compares it to a known set of observations. Complementing SLAM with the invention provides "see-through capability" to existing approaches. As another example, the invention may be used to detect people inside buildings and particular rooms. This may be advantageous in order to detect people trapped in hazardous scenarios such as earthquake. The invention may also be used to detect underground facilities such as tunnels or illegal structures.

The invention presents a comprehensive foundation for obstacle mapping, based on a small number of wireless measurements. More specifically, three approaches based on coordinated space, random space and frequency sampling are presented. Devices within the ad hoc network utilize the sparse representation of the map in space, wavelet or spatial variations, in order to reconstruct the map cooperatively, based on minimal measurements, and more importantly in a non-invasive manner.

The described embodiments are to be considered in all respects only as illustrative and not restrictive, and the scope of the invention is not limited to the foregoing description. Those of skill in the art will recognize changes, substitutions and other modifications that will nonetheless come within the scope of the invention and range of the claims.

DESCRIPTION OF THE DRAWINGS

The preferred embodiments of the invention will be described in conjunction with the appended drawing provided to illustrate and not to the limit the invention, where like designations denote like elements, and in which.

DETAILED DESCRIPTION OF THE PREFERRED EMBODIMENT

Compressive sampling (otherwise known as compressed sensing, compressive sensing or sparse sensing) asserts that certain signals can be acquired from far fewer samples or measurements than traditional methods. More specifically, compressive sampling is based on the fact that real-world signals typically have a sparse representation in a certain transformed domain. Compressive sampling relies on sparsity and incoherence. Sparsity pertains to the signals of interest and incoherence pertains to the sensing modality.

In an overview of compressive sampling, consider the case where a vector $x \in \mathbb{R}^N$ is to be recovered. For two-dimensional ("2D") signals, vector x can represent the columns of the matrix of interest stacked up to form a vector. The incomplete linear measurement of vector x obtained by the robot devices, wherein K<<N, is represented by $\gamma \in \mathbb{R}^K$. Thus, $\gamma = \Phi r$ where $\Phi$ is the observation matrix. Clearly solving for x based on the observation set $\gamma$ is an ill-posed problem as the system is severely under-determined (K<<N).

However, supposing that x has a sparse representation in another domain, it can be represented as a linear combination of a small set of vectors $x = \Gamma X$ where $\Gamma$ is an invertible matrix and X is S-sparse, i.e., $|supp(X)|=S \ll N$ where $supp(X)$ refers to the set of indices of the non-zero elements of X and $|\cdot|$ denotes its cardinality—the measure of the "number of elements of the set". Therefore, the number of non-zero elements in X is considerably smaller than N. Therefore, $\gamma = \Psi X$ where $\Psi = \Phi \times \Gamma$. If $S \leq K$ and the positions of the non-zero coefficients of X are known, this problem could be solved using traditional techniques such as leas-squares. However, the structure of X is unknown except for the fact that it is sparse. The problem may be solved using compressive sensing.

If K≥2S and under specific conditions, the desired X is the solution to the optimization problem min $\|X\|_0$ such that $y=\Psi X$, where $\|X\|_0 = |supp(X)|$ represents the zero norm of vector X. Only 2×S measurements are needed to recover X and therefore x fully. However, the requirement to solve a non-convex combinatorial problem is not practical. The $l_1$ relaxation min $\|X\|_1$ subject to $\gamma=\Psi X$ is considered. Assuming that X is S-sparse, the $l_1$ relaxation can exactly recover X from measurement $\gamma$ if matrix $\Psi$ satisfies the Restricted Isometry Condition ("RIC") for $$(2S, \sqrt{2}-1).$$

Matrix $\Psi$ satisfies the RIC with parameters $(Z, \epsilon)$ for $\epsilon \in (0, 1)$ if $(1-\epsilon)\|c\|_2 \leq \|\Psi c\|_2 \leq (1+\epsilon)\|c\|_2$ for all Z-sparse vectors c. The RIC condition is mathematically related to the uncertainty principle of harmonic analysis, yet it has a simple intuitive interpretation in that it aims at making every set of Z columns of the matrix $\Psi$ as orthogonal as possible. While it is not possible to define all the classes of matrices $\Psi$ that satisfy RIC, it is shown that random partial Fourier matrices as well as random Gaussian of Bernoulli matrices satisfy RIC with the probability $1-O(N^{-M})$ if $K \geq B_M S \times \log^{O(l)} N$ where $B_M$ is a constant, M is an accuracy parameter, and $O(\cdot)$ is Big-O notation used to describe the limiting behavior of the function. Therefore, the number of required measurements could be considerably less than N.

While the recovery of sparse signals is important, real signals may rarely be sparse. Most signals, however, are compressible in that most of signal's energy is in very few coefficients. In practice, the observation vector $\gamma$ is also corrupted by noise. The $l_1$ relaxation and the corresponding required RIC condition can be easily extended to the case of noisy observations with compressible signals.

The compressive sensing algorithms can reconstruct the signal, and specifically the mapping framework of the invention, based on three reconstruction approaches: basis pursuit, matching pursuit, and total variation minimization. The compressive sensing algorithms that reconstruct the signal based on $l_1$ optimization are referred to as basis pursuit. Sparse Reconstruction by Separable Approximation ("SPARSA") is an example of a relatively new solver, based on $l_1$ relaxation, which is computationally efficient and effective. Matching pursuit is a reconstruction using successive interference cancellation. Matching pursuit includes both Orthogonal Matching Pursuit ("OMP") and Regularized Orthogonal Matching Pursuit ("ROMP"). OMP iteratively multiplies a measurement vector to recover the strongest component and then subtracts is effect before continuing. ROMP recovers a set of indices at the same time at every step versus only one at a time thereby resulting in a faster recovery. Reconstruction using total variation minimization uses the sparsity in the gradient.

Mobile nodes build a map of obstacles non-invasively. Although the following is discussed in reference to mobile nodes or mobile robot devices, it is contemplated that the nodes or robots may be stationary.

The invention is discussed in reference to building a 2D map of obstacles, although a 3D map is also contemplated. In instances where the invention is applied to real 3D obstacles, a horizontal 2D cut is constructed as described more fully below. According to the invention, a wireless transmission is expressed as a function of obstacle information.

Figure 1:
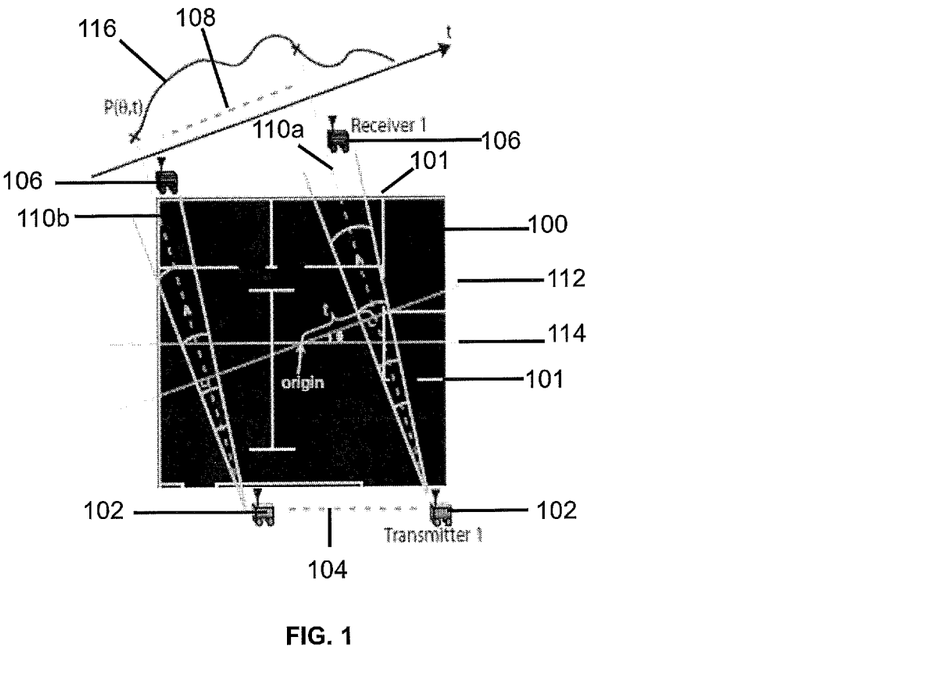
FIG. 1 illustrates an obstacle map using coordinated wireless measurements according to one embodiment of the present invention.
Figure 2:
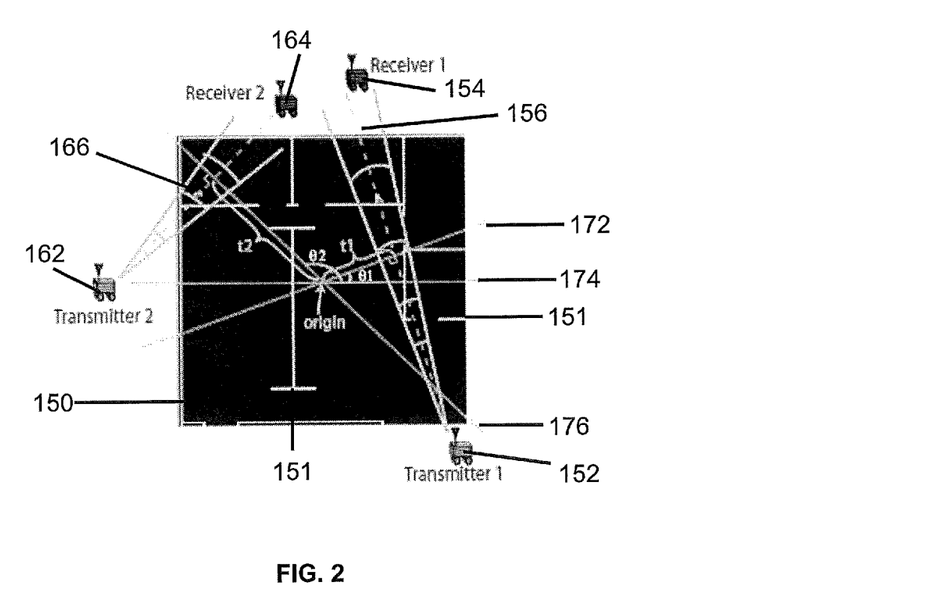
FIG. 2 illustrates an obstacle map using random wireless measurements according to one embodiment of the present invention.

FIG. 1 and FIG. 2 illustrate obstacle maps according to one embodiment of the present invention. More specifically, FIG. 1 and FIG. 2 illustrate a sample 2D obstacle map wherein a number of robot devices want to map the space before entering it. The term "obstacle map" refers to a 2D or 3D map of an environment, where zero values denote locations where there are no obstacles and non-zero values denote obstacle locations. Each non-zero value may be the decay rate of the wireless signal within the object at that location. A binary obstacle map may be represented by $g_n(u,v)$ at position (u,v) for $u,v \in \mathbb{R}$. Specifically, $$g_n(u, v) = \begin{cases} 1 & \text{if } (u, v) \text{ is an obstacle} \\ 0 & \text{else.} \end{cases}$$

FIG. 1 is directed to an obstacle map using coordinated wireless measurements. As shown in FIG. 1, a first node 102 is a transmitter that communicates with a second node 106, which is a receiver. The nodes 102, 106 move outside the environment 100. In this embodiment, the nodes are mobile. Specifically, the first node 102 travels along path 104 and the second node 106 travels along path 108. The communication between nodes contains implicit information of the obstacles 101 along the communication paths 110a, 110b. The communication path 110a corresponds to distance t and angle θ. The communication path 110a is at a distance t from the origin and is perpendicular to the line 112 that is at angle θ with the x-axis 114. Projection 116, specifically P(θ,t), represents the received signal power in the transmission along the communication path 110a that corresponds to distance t and angle θ and the received signal power in the transmission along the communication path 110b that corresponds to movement of the first and second nodes 102, 106. The three main dynamics of path loss, shadowing, and multipath fading to characterize the received signal power may be represented by $P(\theta,t)=P_s(\theta,t)w(\theta,t)$. The contribution of distance-dependent path loss and shadowing is represented by:

$$P_s(\theta, t) = \underbrace{\frac{\beta P_T}{(d(\theta, t))^\alpha}}_{\text{path loss}} \times \underbrace{e^{\sum_i r_i(\theta,t) n_i(\theta,t)}}_{\text{shadowing due to obstacles}}.$$

For the path loss term, $P_T$ represents the transmitted power, $d(\theta,t)$ represents the distance between the first node 102 and second node 106 across the communication path 110a, α represents the degradation exponent, and β represents a constant that is a function of system parameters. For the shadowing (or shadow fading) term, $r_i$ represents the distance traveled across the $i^{th}$ object along the (θ,t) communication path 110a, and $\eta_i<0$ is the decay rate of the wireless signal within the $i^{th}$ object 101. Furthermore, the summation is over the objects 101 across the communication path 110a. As can be seen, shadowing characterizes wireless signal attenuation as it goes through the obstacles 101 along the communication path 110a and therefore contains information about the objects 101 along the communication path 110a. A positive random variable with unit average, which models the impact of multipath fading is represented by ω(θ,t). Thus, ln P(θ,t) may be modeled as follows:

$$\ln P(\theta, t) = \underbrace{\ln P_T}_{\text{transmitted power in dB}} + \underbrace{\beta_{dB} - \alpha \ln d(\theta, t)}_{\text{path loss } (\leq 0)} + \underbrace{\sum_i r_i(\theta, t) n_i(\theta, t)}_{\substack{\text{shadowing effect due to} \\ \text{blocking objects } (\leq 0)}} + \underbrace{w_{dB}(\theta, t),}_{\text{multipath fading}},$$

where $\beta_{dB}=\ln \beta$ and $\omega_{dB}=\ln \omega(\theta,t)$.
Then, $$h(\theta, t) \stackrel{\Delta}{=} \ln P(\theta, t) - \ln P_T - (\beta_{dB} - \alpha \ln d(\theta, t))$$
$$= \underbrace{\sum_i r_i(\theta, t) n_i(\theta, t)}_{\text{shadow fading effect}} + \underbrace{w_{dB}(\theta, t).}_{\text{multipath fading}}.$$

Path loss and shadowing represent the signal degradation due to the distance travelled along communication paths and obstacles 101 respectively and $\omega_{dB}(\theta,t)$ represents the impact of multipath fading. By using an integration over the line that corresponds to θ and t, the expression becomes $$h(\theta, t) = \int\int_{line\ (\theta, t)} g(u, v) du dv + w_{dB}(\theta, t),$$

where $$g(u, v) = \begin{cases} n(u, v) & \text{if } g_n(u, v) = 1 \\ 0 & \text{else,} \end{cases}$$

with $g_n(u,v)$ representing the binary map of the obstacles 101 and η(u,v) denoting the decay rate of the signal inside the object 101 at position (u,v). The true map of the obstacles 101 including wireless decay rate information is represented by g(u,v). As can be seen, h(θ,t), obtained through wireless measurements contains implicit information on the obstacle map. It is contemplated that the path loss component $$\frac{\beta_{dB} - \alpha \ln d(\theta, t)}{\text{path loss } (\leq 0)}$$

can be estimated by using a few Line Of Sign ("LOS") transmissions in the same environment. Therefore, its impact can be removed and the second node 106, or receiving robot device, can calculate h(θ,t).

FIG. 2 is directed to an obstacle map using random wireless measurements. As shown in FIG. 2, first node 152 is a transmitter that communicates with a second node 154, which is a receiver. Furthermore, a third node 162 communicates with a fourth node 164. Each node 152, 154, 162, 164 are positioned outside the environment 150. In this embodiment, the nodes are stationary. The communication between nodes contains implicit information of the obstacles 151 along the communication paths 156, 166. The communication path 156 corresponds to distance t1 and angle θ1. The communication path 156 is at a distance t1 from the origin and is perpendicular to the line 172 that is at angle θ1 with the x-axis 174. The communication path 166 corresponds to distance t2 and angle θ2. The communication path 166 is at a distance t2 from the origin and is perpendicular to the line 176 that is at angle θ2 with the x-axis 174.

FIG. 2 illustrates pairs of robot devices making wireless measurements. In this case, it is not assumed that the robot devices are attempting to have a specific pattern such that θ and t can be chosen randomly. Thus, for a given θ and t pair, a wireless transmission and reception is made. Letting $\gamma_{s,r}$ denote a vector that contains all the acquired random wireless measurements, then the following is obtained: $\gamma_{s,r} = \Psi_{s,r} V_{g_s}$, where $\Psi_{s,r}$ represents random space sampling and $V_{g_s}$ represents total variation sparsity—sparsity of the spatial variations for reconstruction. The random sampling matrix $\Psi_{s,r}$ is similar to Matrix $\Psi_{s,c}$, except that it has no specific pattern. The obstacle map may be similarly solved using total variation sparsity. The random space sampling approach is, in particular, useful for scenarios in which the robot devices cannot make coordinated measurements, due to environmental constraints.

The invention may extract the obstacle map in different ways from a small number of wireless measurements, as described more fully below. The multipath fading term presents a considerable challenge in extracting the map. However, a proper design and control of transmit/receive ("TX/RX") antennas reduces the impact of multipath fading, making mapping based on wireless transmissions feasible.

Figure 3:
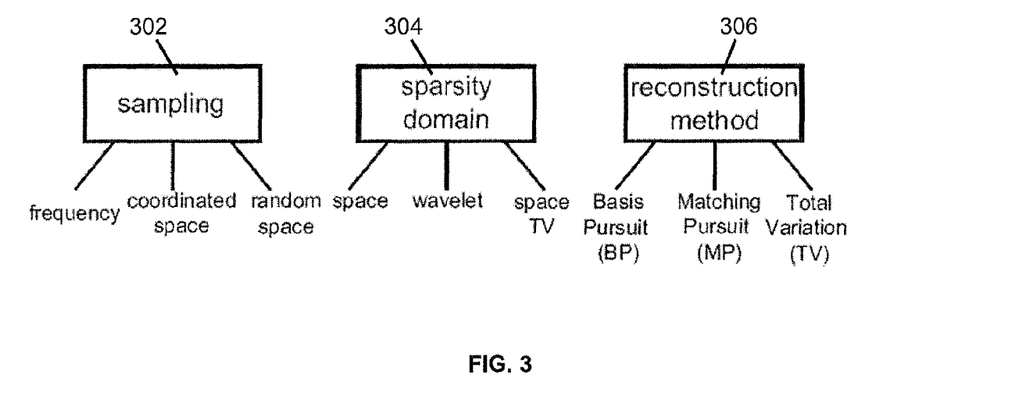
FIG. 3 illustrates the elements of compressive cooperative obstacle mapping according to the present invention.

The present invention is robust to noise and multipath fading, even with a small number of wireless measurements. The invention may be implements using different possibilities in terms of sampling, sparsity domain, and reconstruction technique. FIG. 3 illustrates the components of compressive cooperative obstacle mapping according to the present invention. The components of compressive cooperative obstacle mapping include sampling 302, sparsity 304, and reconstruction 306. Sampling 302 includes frequency, coordinated space and random space. Sparsity 304 includes space, wavelet and space total variation. Reconstruction methods 306 include basis pursuit, matching pursuit, and total variation. It should be noted that not all the combinations of FIG. 3 result in a proper problem formulation as discussed more fully herein.

In one embodiment, frequency sampling uses coordinated wireless measurements. Obstacle mapping may utilize the sparsity in wavelet and total variations while impacting non-ideal frequency sampling. Turning to FIG. 1, pairs of robot devices make coordinated wireless measurements. Two robot devices move parallel to line 112 outside the environment 100 in a coordinated fashion, such that a number of wireless channel measurements are formed at different ts By changing t at a specific θ, a projection 116 is formed P(θ,t) for a set of ts, i.e., a set of ray integrals.

The 2D Fourier transform of g is represented by $G_f(\theta_f, f)$ expressed in the polar coordinates, where $\theta_f$ is the angle from the x-axis and f is the distance from the origin. $H_t(\theta, f)$ denotes the 1D Fourier transform of h(θ,t) with respect to t: $H_t(\theta, f) = \int h(\theta,t)e^{-j2\pi ft}dt$. The Fourier Slice Theorem allows the frequency response of the 2D obstacle map to be sampled, using a projection based on gathering coordinated wireless measurements.

By making a number of measurements at different ts for a given θ, the Fourier Slice Theorem allows measure of the samples of the Fourier transform of the map at angle θ. The Fourier transform of the obstacle map can be sampled at different angles by changing θ. The problem may then be posed in a compressive sampling framework. By measuring the received signal power across a number of rays, the robot devices can indirectly sample the Fourier transformation of the obstacle map. Then the sparsity in the space, space total variation, or wavelet domain may be used for reconstruction, as explained more fully below.

Reconstruction using the sparsity in space or total variation is examined, along with reconstruction using the sparsity in the wavelet domain and the impact of non-ideal frequency sampling.

With reconstruction using the sparsity in space or total variation, the vector representation of the discrete version of $G_f$ (2D Fourier transform of the obstacle map) is denoted by $V_{G_f}$, where the columns are stacked up to form a vector. The very few samples of $G_f$ acquired by through wireless channel measurements are represented by $\gamma_j$, across a number of coordinated rays, and applying the Fourier Slice Theorem results in $$y_f = \Phi_{pt} V_{G_f} \text{ and } V_{G_f} = \Gamma_f V_{g_a} \Rightarrow y_f = \Psi_{f,s} V_{g_s}$$

Fourier sampling and space or total variation sparsity, where $\Phi_{pt}$ is a point sampling matrix:

$$\forall i 1 \leq i \leq K, \exists j 1 \leq j \leq N$$

such that $$\Phi_{pt}(i, j) = 1$$

and $$\forall i 1 \leq i \leq K, \forall j \neq j', 1 \leq j, j' \leq N \text{ if } \Phi_{pt}(i, j) = 1 \rightarrow \Phi_{pt}(i, j') = 0,$$

with K and N denoting the sizes of $\gamma_j$ and $V_{G_j}$, respectively.

Matrix $\Phi_{pt}$ represents a matrix with only one 1 in every row. If there are redundant measurements, there may be more than one 1 in every column. Otherwise, there will be at most one 1 in every column. With the discrete obstacle map represented by $g_s$, then $$V_{g_i}$$

denotes the vector representation of $g_s$ and $\Gamma_f$ is the Fourier transform matrix. When applied to a vector that is formed by stacking the columns of a 2D map, it results in the vector representation of the 2D Fourier transform of the map such that $$\Psi_{f,s} \triangleq \Phi_{pt} \times \Gamma_f.$$

These matrices meet the RIC condition and it can be easily confirmed that the coherence between point sampling and compression basis is 1, which is the lowest possibility. The equation $$y_f = \Phi_{pt} V_{G_f}$$

and $$V_{G_f} = \Gamma_f V_{g_s} \Rightarrow y_f = \Psi_{f,s} V_{g_s}$$

can then be solved through compressive sensing approaches such as basis pursuit or matching pursuit, by using the sparsity in the space domain. Alternatively, the sparsity in the total variation of $V_g$, can be considered.

An obstacle map is also considerably sparse in the wavelet domain such that reconstruction may use this sparsity in the wavelet domain. With $G_w$ representing the 2D wavelet transform matrix of the discrete obstacle map $g_s$, then $$y_f = \Phi_{pt} V_{G_f}$$

and $$V_{G_f} = \Gamma_w V_{G_w} \Rightarrow y_f = \Psi_{f,w} V_{G_w}$$

Fourier sampling and wavelet sparsity, where $$\Gamma_w = \Gamma_f \times W^{-1}.$$

W represents a 2D wavelet matrix such that when applied to a vector that is formed by stacking the columns of a 2D map, it results in the vector representation of the 2D wavelet transform of the map resulting in $$\Psi_{f,w} \triangleq \Phi_{pt} \times \Gamma_u.$$

Sampling in the frequency domain using the Fourier Slice Theorem is applicable in the case where the signals are continuous. For the case of a sampled signal in obstacle mapping), the Fourier Slice Theorem becomes an approximation. The quality of the approximation depends on the resolution of the sampled 2D signal and projections. The term "non-ideal frequency sampling" is used to differentiate the realistic case from the case where the frequency samples are ideally available through the Fourier Slice Theorem. With $g(\theta,t)$, $G_f(\theta,f)$, $h(\theta,t)$, and $H_t(\theta,f)$ representing the continuous signals, expressed in polar coordinates, as discussed above, $h_s(\theta,t)$ represents samples of $h(\theta,t)$ acquired through wireless measurements at step intervals of $$\Delta : h_s(\theta, t) = \sum_n h(\theta, t = n\Delta)\delta(t - n\Delta),$$

where $\delta(.)$ is the impulse fraction.

The Fourier transformation of this sampled signal is represented by $\hat{H}_t(\theta,f)$ such that $$\hat{H}_t(\theta, f) = \sum_n h(\theta, t = n\Delta)e^{-j2\pi f n\Delta} = \frac{1}{\Delta}\sum_n H_t\left(\theta, f - \frac{n}{\Delta}\right).$$

To prevent aliasing, $$\Delta \leq \frac{1}{2\Omega_{f,\theta}}$$

where $\Omega_{f,\theta}$ is the bandwidth of the corresponding continuous function at that angle ($h(\theta,t)$). Similarly, $g_s$ denotes the sampled version of g using a 2D impulse train. Thus, $$\hat{G}_f(f_i, f_q) = \sum_n \sum_m g(i = n\Delta, q = m\Delta)e^{-j2\pi n\Delta f_i - j2\pi m\Delta f_q} =$$

$$\frac{1}{\Delta^2}\sum_n \sum_m G_f\left(f_i - \frac{n}{\Delta}, f_q - \frac{m}{\Delta}\right), \text{ where } \hat{G}_f(f_i, f_q)$$

is the Fourier transformation of $g_s$, expressed in the Cartesian coordinates and $$g(i = n\Delta, q = m\Delta)$$

is the original map calculated at the inphase and quadrature components of $n\Delta$ and $m\Delta$ respectively. In order to prevent aliasing, $$\Delta \leq \frac{1}{2\Omega},$$

where $\Omega$ represents the bandwidth of the continuous 2D obstacle map.

Wireless measurements will result in measuring $$\hat{H}_t(\theta, f).$$

Then, that is related to the 2D Fourier of the sampled 2D map through approximation, using the Fourier Slice Theorem:

$$\hat{H}_t(\theta, f) \approx \hat{G}_f(\theta, f)$$

for samples of $$f \in \left[\frac{-1}{2\Delta}, \frac{1}{2\Delta}\right).$$

Since the map (and any projection) is space-limited, it cannot be bandlimited and as such, there will always be aliasing. Therefore, the smaller $\Delta$ is, the better the quality the approximation. The impact of non-ideal frequency sampling on mapping quality is now discussed.

As discussed above, the frequency response of the obstacle map may be collected using coordinated wireless measurements. Alternatively, the coordinated measurements can be used for direct space sampling and reconstruction. With $\gamma_{s,c}$ denoting a vector that contains the acquired coordinated samples of $h(\theta,t)$, then $\gamma_{s,c} = \Psi_{s,c} V_g^s$ coordinated space sampling and total variation sparsity, where Matrix $\Psi_{s,c}$ is a zero-one matrix. In each row of $\Psi_{s,c}$, the non-zero elements correspond to the obstacle map pixels that the corresponding ray visited, with each non-zero value indicating the distance travelled in the corresponding pixel. This matrix may not have good RIC properties, which can result in a poor performance if sparsity in the space domain is used (same is the case for the formulation in the wavelet domain). As such, a better way of solving for the obstacle map is by using the sparsity in total variation.

Again, an obstacle map is typically considerably sparse in both space and wavelet domains. Furthermore, its spatial variations, measured by its total variation, are also considerably sparse. Efficient obstacle mapping results from utilizing the sparsity in spatial variations.

Figure 4:
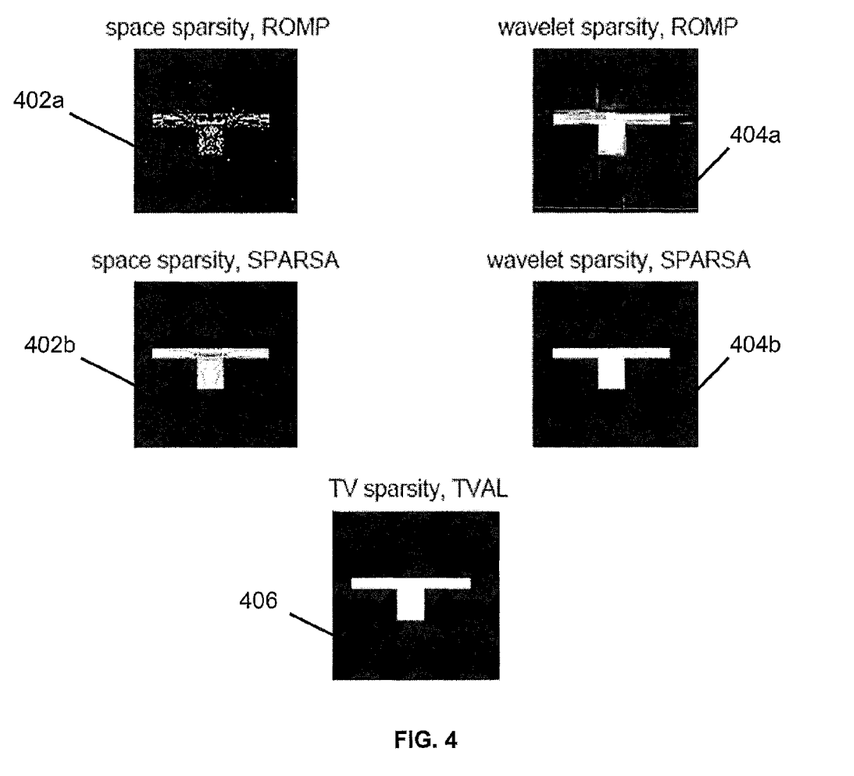
FIG. 4 illustrates the performance of different sparsity/reconstruction techniques according to the present invention.

In one embodiment, the obstacle map is sampled in the frequency domain (ideal sampling) using coordinate wireless measurements and the Fourier Slice Projection Theorem. In the case of frequency sampling when using the sparsity in the space domain, SPARSA is a very efficient reconstruction technique as compared to OMP, and ROMP approaches. FIG. 4 illustrates the performance of different sparsity/reconstruction techniques according to the present invention.

Considering frequency sampling and reconstruction using the sparsity in the wavelet domain 404a, 404b, the sparsity in the wavelet domain 404a, 404b is noticeably higher than the space domain 402a, 402b. Performance of SPARSA reconstruction improves drastically when considering sparsity in the wavelet domain 404b as compared to sparsity in the space domain 402b.

Another approach used with frequency sampling relates to sparsity in the spatial variations for reconstruction 406. This approach results in a further performance improvement over using SPARSA in the space and wavelet domains. However, the SPARSA wavelet sparsity approach 404b outperforms the SPARSA space sparsity approach 402b and total variation approach 406 (using a TVAL-based solver) at considerably high sample rates (see FIG. 4). As such, frequency sampling and reconstruction based on spatial variations is viable for compressive obstacle mapping.

Now the performance of different sampling techniques such as Fourier, coordinated-space, and random-space approaches is considered. For the coordinated space case, the x-axis can be thought of as being similar to the frequency sampling case such that coordinated measurements along a number of angles are collected. The total number of coordinated transmissions/receptions along these angles then results in an equivalent percentage of the overall map size in pixels (the quoted sampling rate). Then, for the random space case, the same number of transmissions/receptions is randomly gathered. This number can also be thought of as an equivalent number of frequency samples for comparison.

The coordinated approach outperforms the random one considerably for the range of demonstrated sampling rates. However, at extremely low sampling rates (for instance one angle only), the random approach outperforms the coordinated approach. This makes sense as the coordinated approach makes measurements at only a few θs, but extensively and at different is for each θ (see FIG. 1). As such, for an extremely low sampling rate, it only measures the obstacle map at a very small number of angles. The random approach, on the other hand, samples the map from possibly different views even at a considerably small sampling rate. If the sampling rate is not extremely small, however, the coordinated approach outperforms the random approach considerably. In terms of computational complexity, the coordinated space case has a noticeably lower complexity than the random space case.

If the frequency samples can be selected perfectly, the performance is considerably better than the space approaches. Now the impact of non-ideal frequency sampling when dealing with real data is discussed, which reveals that the performance of the frequency sampling case becomes comparable to the coordinated space approach for real data.

According to one embodiment of the invention, robot devices perform wireless channel measurements to build a map of an environment without physically being present within the environment. The capability of building a map of an environment without having to enter the environment is valuable to a number of applications such as emergency response, surveillance, security, military, and environmental monitoring. Additionally, building a map of an environment without having to enter the environment may be useful to locate objects inside the environment as well as determine their material properties. Furthermore, the invention may be used to complement current mapping approaches such as SLAM.

The advent of robotic systems facilitates the design of an automated cooperative mapping system and allows for collecting wireless measurements with flexibility, reconfigurability, and a high spatial resolution. There are two key enabling factors that contribute to the success of cooperative compressive obstacle mapping: 1) use of robot devices, which enable automated positioning for collecting wireless measurements and 2) use of adaptive directional narrow-beam antennas. Adaptive directional narrow-beam antennas facilitate limiting the impact of multipath fading. Furthermore, the invention considers a shadowing component that carries information on the obstacles. Multipath fading appears as additional noise and can ruin mapping quality—especially as the size of the environment that needs to be mapped (and as a result the distance between the transmitting and receiving robots) increases.

Figure 5:
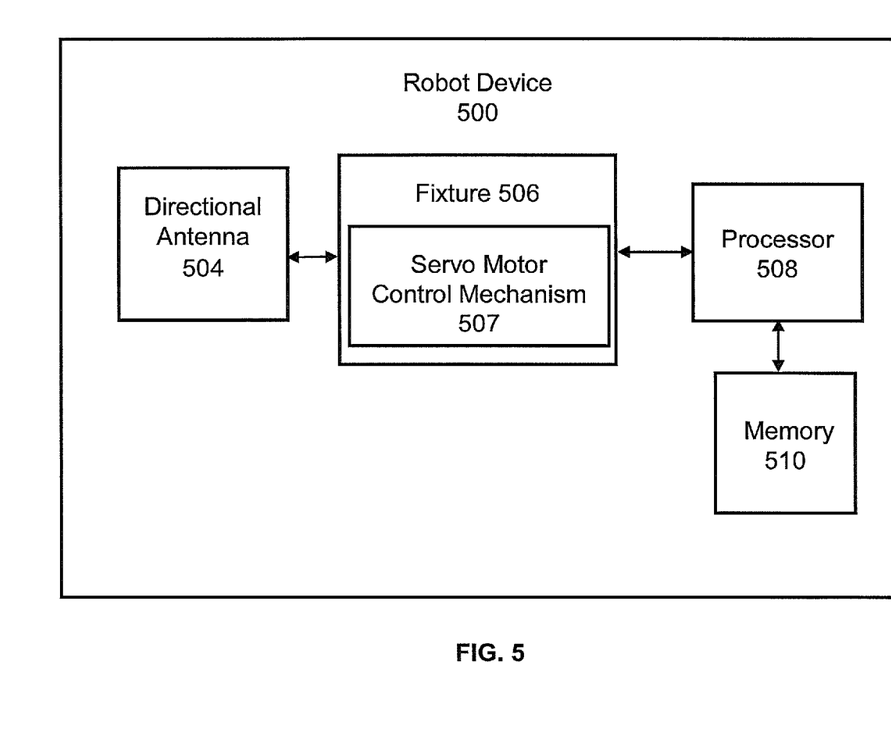
FIG. 5 illustrates a node or robot device according to one embodiment of the present invention.

As shown in FIG. 5, a node or robot device 500 is equipped with adaptive directional antenna 504. An adaptive directional narrow-beam antenna 504 with narrow-beam width for cooperative obstacle mapping is used to limit the impact of multipath fading. In one embodiment, the directional antenna 504 may be a GD24-15 2.4 GHz parabolic grid antenna that includes a 15 dBi gain with a 21° horizontal and 17° vertical beamwidth and is suitable for IEEE 802.11b/g applications.

Each robot device 500 includes a removable electromechanical fixture 506 that holds the directional antenna 504. The fixture 506 includes a servo motor control mechanism 507 in order to intelligently rotate the directional antenna 504 such that it can point at any desired direction. Rotating the angle of the antenna 504 by the servo motor control mechanism 507 is not necessary for the frequency sampling or coordinated space sampling approaches. Since the beamwidth of the antenna 504 if fixed, the electromechanical fixture 506 facilitates rotation of the antenna 504 such that it may point in any direction. The electromechanical fixture 506 including servo motor control mechanism 507 is controlled by processor 508. It is contemplated that the processor 508 may be a micro-controller.

In one embodiment, the robot device 500 is a Pioneer P3-AT mobile robot, however any robot device is contemplated that is reliable for indoor, outdoor and rough-terrain projects. It is contemplated that each robot device 500 may be further equipped with a wireless card for connecting all robot devices within a computer network. The antenna 504 of each robot device 500 is connected to a processor 508 through the fixture 506. The antenna 504 and fixture 506 including control mechanism 507 are in communication with a memory 510, although it is contemplated that the antenna 504 may be in direct communication with the memory 510 without the need for a processor 508.

The robot device 500 includes instructions, such as a software program that is part of the processor 508 or stored in memory 510 that controls localization and obstacle avoidance of the robot device 500.

The processor 508 receives and may further record information—either in the processor 508 itself or in memory 510—communicated between at two robot devices 500. Information may include wireless measurements including transmissions/receptions, location, or position of the robots devices 500. The robot devices 500 may communicate their positions in order to align their antennas 504 towards each other. Alternatively, feedback from the received communication signal strength can also be used by the robot devices 500 for adaptive alignment. The information communicated between two or more robot devices 500 is used in order to map the obstacle.

Figure 6:
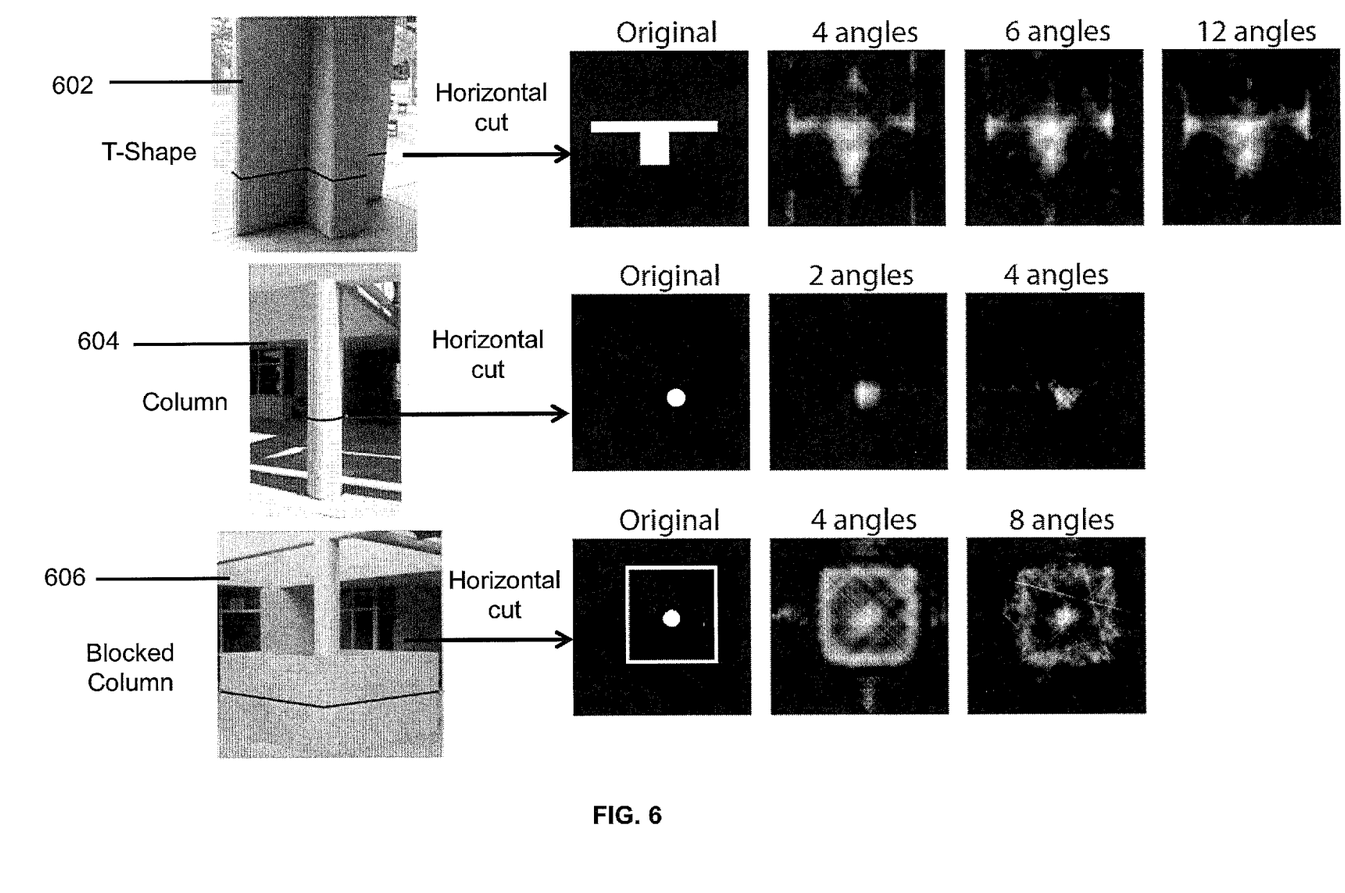
FIG. 6 illustrates the performance of coordinated space sampling in constructing obstacle maps according to one embodiment of the present invention.

FIG. 6 illustrates the performance of coordinated space sampling in constructing obstacle maps according to one embodiment of the present invention. As shown in FIG. 6, obstacle maps are created for a T-shape obstacle 602, a column obstacle 604, and a blocked column obstacle 606. Horizontal cuts of these obstacles are shown as well as the reconstructions of the obstacles based on only wireless channel measurements. Although horizontal cuts of the obstacles are considered, it is contemplated that the invention is equally applicable to vertical cuts or cuts of the obstacle in any plane.

FIG. 6 illustrates the mapping quality as a function of the number of utilized angles, i.e., 2 angles, 4 angles, 6 angles, 8 angles, and 12 angles. In this embodiment, all the reconstructions are based on coordinated space sampling—two robot devices that move along a number of angles in parallel (see FIG. 1). Since, coordinated space or frequency sampling and TV sparsity provides the best overall performance and computational complexity for most cases, coordinated space sampling, sparsity in the spatial variations (total variation) and TVAL for reconstruction are used.

For each total number of utilized angles, uniformly-distributed angles are chosen. For instance, the first case of four total angles means that the robot devices make coordinated wireless measurements by moving along four pairs of parallel lines. These lines have the angles of 0°, 90°, 45° and 135° with respect to the x-axis of FIG. 1. As seen in FIG. 6, performance improves considerably with the more coordinated measurements made at a low sampling rate.

Figure 7:
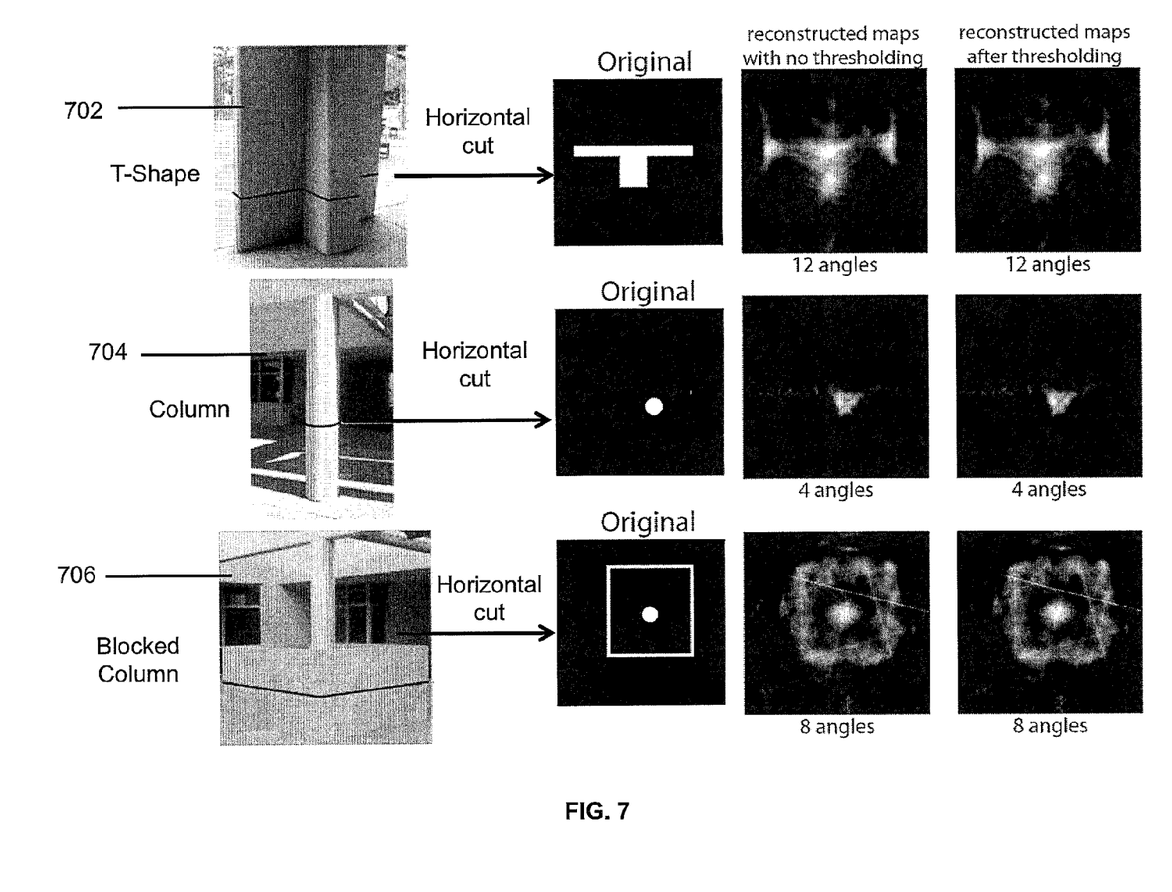
FIG. 7 illustrates the performance of coordinated space sampling with an applied threshold value in constructing obstacle maps according to one embodiment of the present invention.

FIG. 7 illustrates the performance of coordinated space sampling with an applied threshold value in constructing obstacle maps according to one embodiment of the present invention. Specifically, obstacle maps are created for a T-shape obstacle 702, a column obstacle 704, and a blocked column obstacle 706. In one embodiment, a threshold value of 10 dB is considered, however any threshold value is contemplated. Using a maximum threshold value of 10 dB, any value below the maximum threshold value is zeroed to avoid scenarios where reconstructed pixels with very small values get magnified by some printers or monitors with certain gamma settings.

Figure 8:
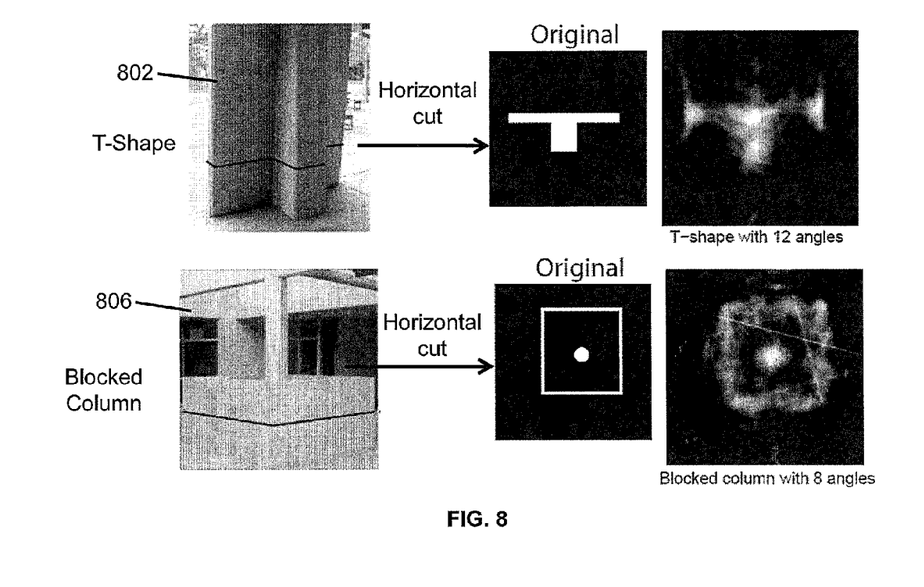
FIG. 8 illustrates the performance of frequency sampling in constructing obstacle maps according to one embodiment of the present invention.

Turning from the coordinated space sampling approach to the frequency sampling approach, the frequency approach outperforms any space approach considerably if the frequency samples can be chosen perfectly. However, there is a loss of performance due to the fact that the Fourier Slice Theorem, while fully holding for continuous functions or proper sampling of bandlimited signals, becomes an approximation when sampling space-limited signals. The quality of this approximation depends on the sampling resolution and the frequency response of the originally created map. FIG. 8 illustrates the performance of frequency sampling in constructing obstacle maps for a T-shape obstacle 802 and a blocked column obstacle 806 according to one embodiment of the present invention. As shown in FIG. 8, the reconstruction quality is almost the same as that of FIG. 6. Even though the frequency approach has a higher computational complexity, it results in a reconstruction very similar to the coordinated space approach.

Figure 9:
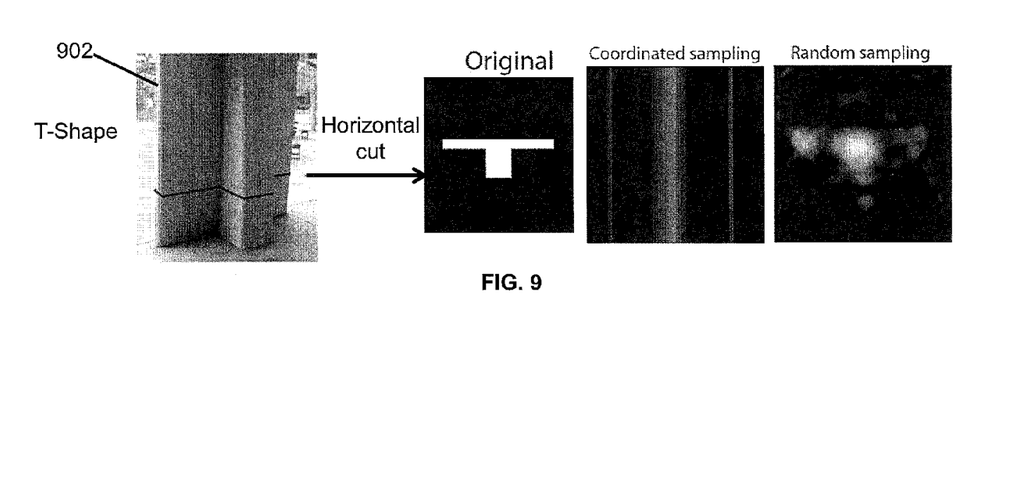
FIG. 9 illustrates the performance of coordinated space sampling and random space sampling in constructing obstacle maps according to one embodiment of the present invention.

If the number of gathered samples is extremely low (as compared to the complexity of the obstacle), then the random space approach typically outperforms the coordinated approach. Specifically, the coordinated approach only measures the obstacles from limited angles at very low sampling rates, while the random approach samples the map from possibly different views. FIG. 9 illustrates the performance of coordinated space sampling and random space sampling in constructing obstacle maps for a T-shape obstacle 902 according to one embodiment of the present invention. As shown by FIG. 9, for the case of random sampling, the obstacle is still visible, albeit noisy, whereas with coordinated measurements, the obstacle is not simply observable at this low rate. However, once the number of given samples is increased beyond one angle, the coordinated approach outperforms the random approach. It should, however, be noted that the computational complexity of the random approach is typically higher (both in terms of gathering and processing of the data) since it requires antenna rotation. Therefore, it is contemplated that the coordinated approach should primarily be used and the random approach should be reserved for extremely low sampling rates (such as one angle only) or for cases where the robot devices cannot physically make coordinated measurements, due to environmental constraints.

The coordinated-space sampling and frequency sampling approaches are two promising techniques for obstacle mapping in a real environment (from a performance standpoint). Furthermore, sparsity in total variation or wavelet can be utilized for reconstruction with minimal sensing. The random sampling case (possibly combined with the coordinated space sampling) can then be utilized in scenarios where there are environmental navigation constraints or when only an extremely low number of measurements can be gathered. The random space approach may be reserved for situations where proper coordinated measurements cannot be physically made. However, the quality of this approximation depends on the sampling resolution and the frequency response of the original obstacle map.

While the invention has been described with reference to particular embodiments, those skilled in the art will recognize that many changes may be made thereto without departing from the scope of the invention. Each of these embodiments and variants thereof is contemplated as falling with the scope of the claimed invention, as set forth in the following claims.

We claim:

1. A method of mapping an obstacle within an environment, comprising the steps of:
    transmitting wirelessly a plurality of signals from a first robot to a second robot at randomly chosen distances and angles relative to an origin, wherein the first robot and the second robot each include an adaptive directional narrow-beam antenna and do not attempt to have a specific coordinated pattern of movement;
    receiving the plurality of signals by the second robot to obtain received signals, wherein portions of the received signals are attenuated by one or more properties of the obstacle;
    measuring by the second robot the plurality of received signals to obtain wireless measurements; and
    constructing a binary map of pixel values by the second robot from the wireless measurements, wherein the one or more properties of the obstacle is represented by a non-zero pixel value and the absence of the one or more properties of the obstacle is represented by a zero pixel value, the binary map of pixel values representing a map of the environment including the obstacle.

2. The method of mapping an obstacle within an environment according to claim 1, wherein the wireless measurements include at least one of path loss, shadowing, and multipath fading.

3. The method of mapping an obstacle within an environment according to claim 1, wherein the one or more properties of the obstacle is the location of the obstacle.

4. The method of mapping an obstacle within an environment according to claim 1, wherein the non-zero pixel value comprises the wireless decay rate of the received signals within the object.

5. The method of mapping an obstacle within an environment according to claim 1, wherein at least one of the first robot and the second robot further comprises:
    a removable electromechanical fixture including a servo motor control mechanism, wherein the removable electromechanical fixture holds the adaptive directional narrow-beam antenna and the servo motor control mechanism rotates the adaptive directional narrow-beam antenna such that it can point at any desired direction.

6. The method of mapping an obstacle within an environment according to claim 1, wherein the wireless measurements are space samples.

7. A system for mapping an obstacle within an environment, comprising:
    at least two robot devices, wherein each robot device comprises:
    a wireless card;
    an adaptive directional narrow-beam antenna configured to transmit and to receive wireless signals;
    a removable electromechanical fixture including a servo motor control mechanism, wherein the removable electromechanical fixture holds the adaptive directional narrow-beam antenna and the servo motor control mechanism rotates the adaptive directional narrow-beam antenna such that it can point at any desired direction;
    a processor, wherein the processor is configured to perform the following steps:
        gathering a plurality of wireless measurements based on the wireless signals at randomly chosen distances and angles relative to an origin while the robot devices do not attempt to have a specific coordinated pattern of movement to obtain gathered wireless measurements, the gathered wireless measurements being random wireless measurements;
        reconstructing the environment based on the random wireless measurements; and
        creating an obstacle map.

8. The system for mapping an obstacle within an environment according to claim 7, wherein the random wireless measurements are space responses in the space domain.

9. The system for mapping an obstacle within an environment according to claim 7, wherein the reconstructing step considers sparsity in one or more selected from the group comprising of: space domain, sparsity domain, and space total variation domain.

10. The system for mapping an obstacle within an environment according to claim 7, wherein the reconstructing step utilizes one or more methods selected from the group comprising of: basis pursuit, matching pursuit, and total variation.

11. The system for mapping an obstacle within an environment according to claim 7, wherein the obstacle map is a 2D slice of a 3D obstacle.

12. The system for mapping an obstacle within an environment according to claim 7, wherein the reconstructing step further comprises the step of applying a threshold to the random wireless measurements.

13. The system for mapping an obstacle within an environment according to claim 12, wherein the threshold value is 10 dB.

14. The system for mapping an obstacle within an environment according to claim 7, wherein the obstacle map is a binary map of pixel values.

15. The system for mapping an obstacle within an environment according to claim 7, wherein the wireless measurements comprise the wireless decay rate of the wireless signal within the object.

* * * * *